(12) United States Patent
Gwisdalla et al.

(10) Patent No.: US 7,936,129 B2
(45) Date of Patent: May 3, 2011

(54) LIGHTING CONVERSION SYSTEM

(75) Inventors: Dieter Gwisdalla, Mietingen (DE); Anthony A. Mangiaracina, Mobile, AL (US)

(73) Assignee: ECO Lighting LLC, Miami, FL (US)

( * ) Notice: Subject to any disclaimer, the term of this patent is extended or adjusted under 35 U.S.C. 154(b) by 368 days.

(21) Appl. No.: 12/062,735

(22) Filed: Apr. 4, 2008

(65) Prior Publication Data
US 2009/0033239 A1 Feb. 5, 2009

Related U.S. Application Data

(60) Provisional application No. 60/910,304, filed on Apr. 5, 2007.

(51) Int. Cl.
*H01J 13/46* (2006.01)
(52) U.S. Cl. ........... 315/59; 315/246; 315/291; 362/221
(58) Field of Classification Search .......... 315/246–248, 315/260, 263, 274, 291, 59; 362/217, 221, 362/222, 260, 263, 265
See application file for complete search history.

(56) References Cited

U.S. PATENT DOCUMENTS

| | | | | |
|---|---|---|---|---|
| 4,163,176 A * | 7/1979 | Cohen et al. | | 315/53 |
| 5,568,018 A * | 10/1996 | Muzic | | 315/276 |
| 6,168,289 B1 * | 1/2001 | Shah | | 362/221 |
| 6,459,215 B1 * | 10/2002 | Nerone et al. | | 315/291 |
| 6,518,715 B1 * | 2/2003 | Reinig | | 315/291 |
| 6,624,554 B2 * | 9/2003 | Holzer | | 313/318.01 |
| 6,773,284 B2 | 8/2004 | Shah | | |
| 7,083,309 B2 | 8/2006 | Chan et al. | | |
| 2001/0034148 A1 * | 10/2001 | Holzer | | 439/236 |
| 2005/0030750 A1 * | 2/2005 | Ehmen et al. | | 362/260 |
| 2008/0174992 A1 * | 7/2008 | Lin | | 362/217 |

* cited by examiner

*Primary Examiner* — Douglas W Owens
*Assistant Examiner* — Tung X Le
(74) *Attorney, Agent, or Firm* — Laurence A. Greenberg; Werner H. Stemer; Ralph E. Locher

(57) ABSTRACT

An adapter for a T12 fluorescent light fixture that is used to convert the fixture into a T5 or T8 fixture. The adapter includes a male input for receiving power supplied by the T12 ballast. The adapter has circuitry that adjusts the power supplied by the T12 ballast to parameters usable by a T5 or T8 fluorescent lamp. Also, the adapter includes a female output for outputting the usable power from the circuitry. The usable power drives the T5 or T8 fluorescent lamp.

6 Claims, 3 Drawing Sheets

US 7,936,129 B2

LIGHTING CONVERSION SYSTEM

CROSS-REFERENCED RELATED APPLICATIONS

This application claims the benefit of U.S. Provisional Application No. 60/910,304, filed Apr. 5, 2007, which application is expressly incorporated herein by this reference.

BACKGROUND OF THE INVENTION

Fluorescent light fixtures have literally been around for years and are commonly used in schools, commercial buildings and even some residential buildings. Fluorescent lights generally are used because they are often cheaper than incandescent lights, and can provide greater output. Thus, it may be more energy efficient and cost-effective to use a fluorescent light fixture.

The standard type of fluorescent light is referred to as the "T12" lamp. These lamps are generally long. However, in recent years, newer "T8" and "T5" lamps have been developed as well. The T5 and T8 lamps can realize substantial energy savings over T12 lamps and can have extended lamp operating life. However, the T5 are generally shorter than the conventional T12 lamps. (The T8 lamps may be the same size as the T12 lamps). Thus, if it very difficult for a user to retrofit an existing T12 fixture with T8 or T5 lamps. Accordingly, there is a need in the art for a new type of system that will allow a building owner to retrofit his or her existing T12 fluorescent light fixtures with either T8 or T5 lamps. Such a device is disclosed herein.

BRIEF SUMMARY OF THE INVENTION

An adapter for use with a T12 fluorescent light fixture having a T12 (magnetic) ballast is taught herein. The adapter comprises a male input capable of receiving power supplied by the T12 ballast. The adapter also includes circuitry that adjusts the power supplied by the T12 ballast to parameters usable by a high frequency fluorescent lamp. A high frequency fluorescent lamp may be, for example, a T5 or T8 fluorescent lamp. The adapter also includes a female output capable of outputting the power from the circuitry. This power output by the female output may be used to drive a T5 or T8 fluorescent lamp.

The adapter may be designed to be retrofit into an existing T12 fluorescent light fixture. More specifically, the adapter may simply be "locked into place." Thus, all the user must do to accomplish the retrofit is remove the T12 lamps and replace them with the adapter. The adapter engages the T12 fixture in the same way that the T12 lamps engage. Once the adapter is loaded with T5 or T8 lamps, the retrofit process is complete. In some embodiments, the T5 or T8 fluorescent lamp may be secured to the adapter prior to the adapter being secured to the T12 fluorescent light fixture. A lengthwise support may be used to support the T5 or T8 lamps. This lengthwise support is part of the adapter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures is not intended to limit the scope of the invention, as claimed, but is merely representative of presently preferred embodiments of the invention.

Figure 1:
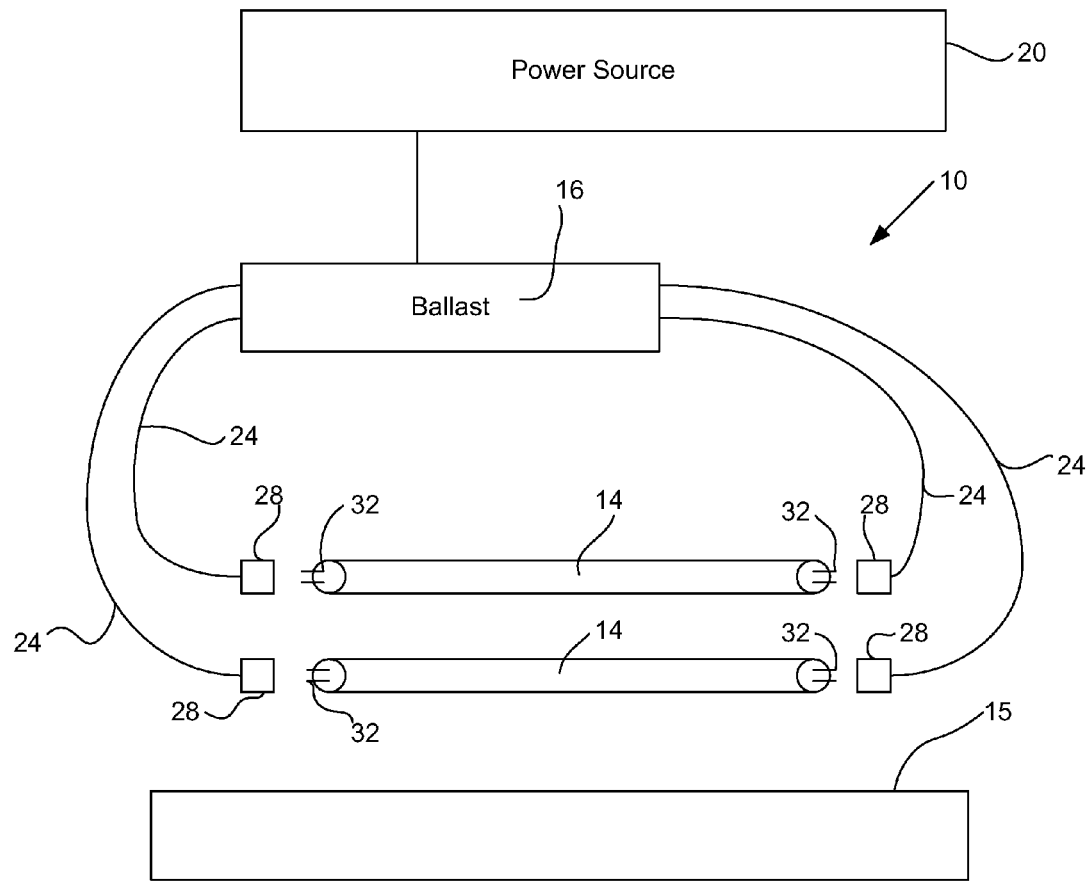
FIG. 1 is a plan view of a prior art fluorescent lighting system.

FIG. 1 is a plan view of a fluorescent light 10 that is known and used in the prior art. The fluorescent light 10 may be installed in buildings, such as commercial or residential buildings. Many customers find the use of such fluorescent lights to be efficient. The cost to run this type of light 10 may be lower than that which is associated with incandescent light fixtures.

The fixture 10 is a low frequency fluorescent light fixture (a T12 fluorescent light fixture), meaning that it is designed for use with common T12 fluorescent lamps 14. These fluorescent lamps 14 are commonly used throughout the world. A cover 15 may be used as part of the light fixture 10. The cover 15 is designed to improve the visual décor of the fixture 10 by "covering up" wires or other portions of the fixture 10.

The fixture 10 includes a ballast 16 (a low frequency ballast) that receives power (electricity) from a power source 20. The ballast may be a magnetic fluorescent 50/60 Hertz ballast. The power source 20 is generally the AC power source that is provided to the building from the local power company. As is known in the art, the ballast 16 is designed to take and convert the power from the power source 20 and convert this power into a form that is usable to drive and light the lamps 14. In general, this conversion involves increasing the voltage of the power and converting and regulating the power from AC to high potential AC power (at the same input frequency). This type of ballast is well known and commercially available. There are a variety of different ballast (and electrical circuits) that may be used to convert the power in this manner (and thus function as the ballast 16). Generally, the ballast 16 will be designed so that it conforms to commercial specifications, buildings codes, etc. such as the type set by ANSI (which is the "American National Standards Institute).

The power output by the ballast 16 is transmitted through wires 24 to the sockets 28. (Sometimes the sockets are referred to as "tombstones"). The sockets 28 are designed to receive the prongs 32 on the lamps 14. In other words, the user will insert the prongs 32 into the sockets 28 as a means of connecting the lamps 14 to the fixture 10. (In some fixtures 10, the prongs 32 will be inserted and then the lamp 14 will be twisted to lock the prongs 32 into place). Once secured, the power from the ballast 16 may then be transferred to the lamps 16 and used to drive the lamps 16. Other components and features of conventional T12 lighting fixtures may be used in the fixture 10, as will be appreciated by those skilled in the art.

Figure 2:
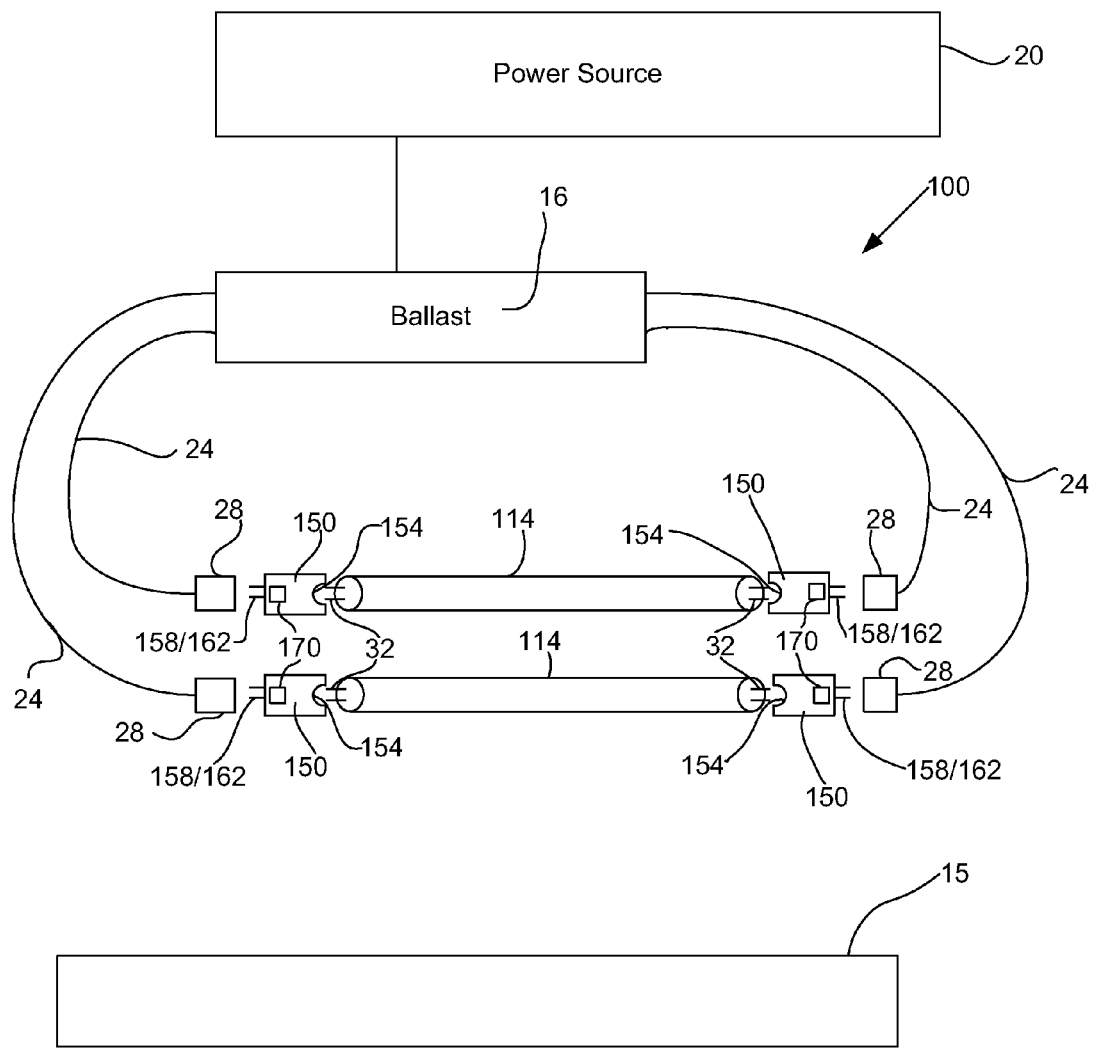
FIG. 2 is view of a fluorescent lighting system using an adapter according to the present embodiments.

FIG. 2 is a perspective view of a lighting fixture 100 according to the present embodiments. The fixture 100 is a fluorescent lighting fixture 100. More specifically, the fixture 100 comprises the fixture 10 of FIG. 1 that has been retrofit and converted into the fixture 100, which is now a T5 or T8 fluorescent lighting fixture. Many of the features of the fixture 100 are similar to that which is described above. For purpose of brevity, this description will not be repeated.

The T5 or T8 lighting fixture generally comprises one or more T5 or T8 fluorescent lamps 114. Again, such lamps 114 are known in the art. If the lamps 114 are T5 lamps, these lamps 114 are generally shorter (i.e., have a smaller length) than the T12 lamps 14 shown in FIG. 1. For example, the T8 and T12 lamps are generally about 4 feet in length, whereas the T5 lamps are about 2 inches shorter. Of course, there are also embodiments in which the T12 and T8 lamps are about 5 feet in length. Such embodiments are also within the scope of the present embodiments. The T5 lamp may also have a different size (such as 1449 cm). All of these potential sizes are within the scope of the present embodiments.

However, in the embodiment shown in FIG. 2, T5 lamps 114 are illustrated that are shorter in length than the conventional T12 lamps 14. Likewise, the power used to drive such lamps 114 is different than that which is used to drive the lamps 14. For example, the lamps 14 of FIG. 1 generally operate at 60 Hertz (and thus the power output by the ballast 16 to drive the lamps 14 is usually at this frequency). However, the lamps 114 operate at high frequency, such as greater than 15 kilohertz (and more particularly greater than 20 kilohertz). Likewise, the voltage needed to drive these lamps 114 may be different than the voltage used to drive the lamps 14. Those skilled in the art will appreciate the differences between T12 lamps and T5/T8 lamps. Such skilled artisans will also appreciate the parameters of the power needed to drive a T5/T8 lamp (rather than a T12 lamp).

Accordingly, in order to retrofit/convert the T12 fixture into the T5/T8 fixture 100, one or more adapters 150 may be used. The adapter 150 may include a female output 154. The female output 154 is an area or feature into which the prongs 32 of the lamps 114 may be inserted. In order to secure the lamp 114 to the adapter 150, the prongs 32 of the lamp 114 are fit into the female output 154. Those skilled in the art will appreciate how to size and configure the female output 154 such that it is capable of receiving the prongs 32 of the lamps 114. This attachment also allows power to transfer from the adapter 150 so that the lamp 114 may be driven. In other words, power supplied by the adapter 150 may be output (through the female output 154) to the lamps 114 (via the prongs 32) as a means of illuminating the lamps 114.

The adapter 150 also includes a male input 158. The male input 158 are generally prongs 162 that will engage the female openings in the sockets 28. In other words, the male input 158 will be inserted into the sockets 28. When the male input 158 is secured to the socket 28, power supplied from the ballast 16 will thus be transferred via the wires 24 to the sockets 28 to the adapter 150. Those skilled in the art will appreciate how to size and configure the male input 158 such that it is capable of engaging/fitting into the socket 28 and receiving power from the ballast 16.

The adapter 150 may also include circuitry 170. The circuitry 170 is designed to adjust the power supplied (output) by the T12 ballast 16 to parameters usable by a T5 or T8 fluorescent lamp. For example, the ballast 16 may output power that is a different voltage than that necessary to drive a T5 or T8 lamp. Accordingly, the circuitry 170 will adjust this parameter (voltage) to the desired level. For example, voltages levels of 120 V, 150 V, or 227 V may be adjusted, as desired. Another parameter of the power output from the ballast 16 that may be adjusted is the frequency. For example, some ballasts 16 will output the power at 60 hertz. However, T5 or T8 lamps may be designed to operate at a much higher frequency, such as for example at 15 kilohertz, 20 kilohertz, or higher. Thus, the circuitry 170 may be designed to increase the frequency to a desired level. Some T5 or T8 ballasts fluorescent lights may be made to conform to commercial/ANSI standards. Accordingly, the circuitry 170 may operate to adjust the parameters of the power to operate/drive an ANSI certified T5 or T8 fluorescent light fixture.

It should be noted that those skilled in the art will appreciate that a variety of different circuits may be used as the circuitry 170 (including integrated circuits such as integrated circuits that incorporate and/or are similar to the type used in compact fluorescent lights). As long as the circuit adjusts the parameters of the power in the desired manner, any type of circuit or circuit features may be used. Some of these circuits may incorporate "push-pull" typology, "half-bridge" typology, etc. All of these circuits are preferred and usable in the present embodiments. Other embodiments may be designed in which the circuit is integrated circuits (such as the type used for compact fluorescent lights) or self-resonant circuits. All of these circuits may be used, depending upon the load of the lamps, cost, the output of the ballast, etc. Currently, integrated circuitry or circuit components from compact fluorescent lights (such as compact fluorescent lights that screw-into a socket) may be inexpensive to manufacture and are readily available, and thus, may be used. Those skilled in the art will appreciate that all such circuit designs may be used. Examples of some types of circuits (or elements of circuits) that may be used as part of the circuitry 170 are provided in the provisional patent application referenced above. In some embodiments, the T5 or T8 lamps 114 must be driven by an electronic ballast (rather than a magnetic ballast). Accordingly, the circuitry operates to form this electronic ballast so that it is capable of driving the lamps 114. Again, those skilled in the art will appreciate that the representation given in FIG. 2 is exemplary and those skilled in the art will appreciate the components, functions, etc. necessary for the circuitry 170 to drive the T5 or T8 lamps 114.

It should be noted that in the embodiment shown in FIG. 2, there is an adapter 150 positioned at each end of the lamps 114. Further each of these adapters 150 includes circuitry 170. Such depictions are made for purposes of clarity. Embodiments may be designed in which only one adapter 150 is used for the entire fixture 100. Other embodiments may be designed in which a single adapter 150 is used for each lamp 114. Still further embodiments may be designed in which only one set of circuitry 170 is used for each lamp 114 and/or one set of circuitry 170 is used for the entire fixture 100.

As noted above, the T5 lamps 114 are shorter than the T12 lamps 14 of FIG. 1. Accordingly, as shown in FIG. 2, the adapter 150 may be positioned to make up for the shorter size of the T5 lamp 114 (by positioning the adapter 150 at the ends of the lamp 114). Of course, if different sized lamps are used, the lamps 114 may need to be "offset" so that they can fit into the fixture. This type of offset is shown in FIG. 3.

It will be appreciated that the present embodiments may provide a simple method by which a user may convert an exiting T12 fluorescent light fixture into a T5 or T8 fixture 100. The user would simply remove the T12 lamps from the fixture and then install the adapter 150. Once the adapter 150 is installed, new T5 or T8 lamps 114 may be inserted. In fact, in some other embodiments, the T5 or T8 lamps 114 may be installed into the adapter 150 prior to the adapter 150 being mounted to the fixture 100. This latter embodiment may be desirable as it will make the installation easier as the user can install the T5 or T8 lamps 114 on the ground rather than trying to lift and install the T5 or T8 lamps 114 when the fixture 100 is overhead in the ceiling.

Once installed the fixture 100 will be a functioning T5 or T8 fixture. Specifically, the power from the ballast 16 will be supplied to the adapter (through the male inputs 158). The circuitry 170 will then adjust the parameters of the power so that this power is capable of driving a T5 or T8 lamp. Once converted, the power will then be output from the adapter 150 to the lamps 114 (via the female outputs 154). Thus, in this manner, the building owner can readily and easily convert the T12 fixtures to more efficient, less expensive T5 or T8 fixtures, without having to undergo the expense of replacing entire fixtures.

Figure 3:
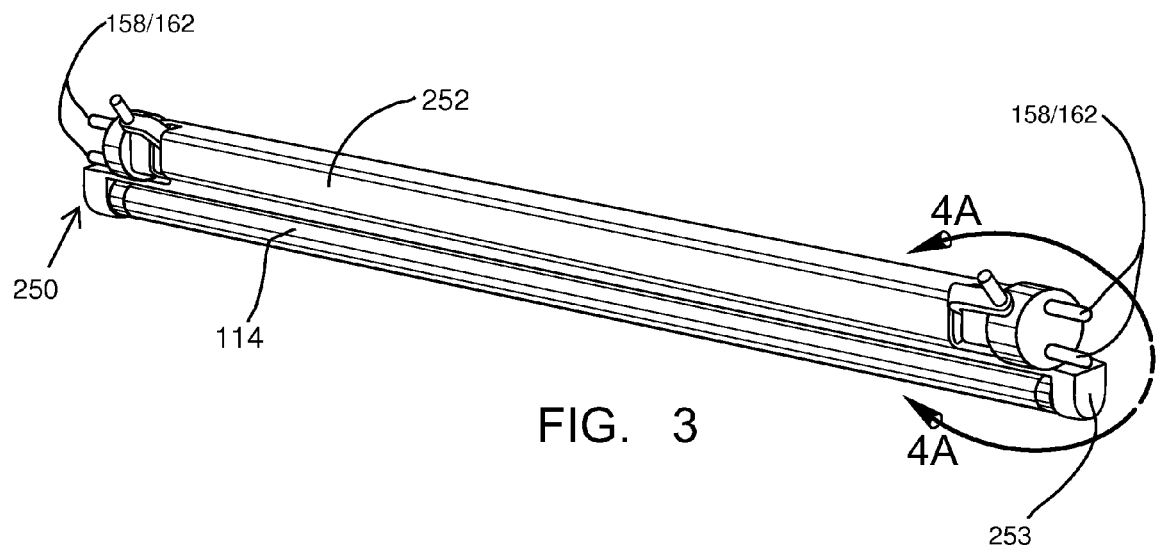
FIG. 3 is a perspective view of another embodiment of an adapter that may be used in the present embodiments.

Referring now to FIG. 3, a perspective view illustrates another embodiment of an adapter 250 that may be used in a fluorescent light fixture 100 (shown in FIG. 2). It should be noted that in the embodiment of FIG. 3, the lamp 114 has a length that is the same or longer than the length of a T12 lamp (as measured by the lengthwise distance between the prongs 162 on either side). Thus, in the embodiment shown in FIG. 3, the lamps 114 are T8 lamps that have the same size as the conventional T12 lamps.

Because the lamps 114 are the same size, a "offset" may be required. As shown in FIG. 3, this may involve adjusting the position of the lamp (such that it is below the adapter 250). In other words, the adapter 250 will fit into the normal space used for the T12 lamps, and then the new T8 lamps will be positioned offset or below the adapter so that it fits into the limited space of the fixture. The fact that the T8 is the same length as the T12 (4 feet) makes it more difficult to design an adapter for, as the adapter has to offset the tube. This offset issue with the T8 may not be an issue with the T5, as it may be shorter than the T12 and can allow the adapter to fit into the space of the T12 lamp. Skilled artisans will appreciate other ways in which the lamps 114 may be offset and/or the adapter 250 may be adjusted as necessary to retrofit the adapter 250 into a fixture. Such adjustment or modifications to the length are within the scope of the art.

As shown in FIG. 3, a lamp 114 has been attached to the adapter 250. More specifically, the adapter 250 may include a lengthwise support 252 which is a cradle or other structure designed to receive and support the lamp 114. In this embodiment, the lamp 114 may be loaded onto the adapter 250 on the ground or on a workbench—i.e., prior to installing the adapter 250 onto a light fixture (not shown). The lengthwise support 252 may additionally include some tombstones 253 at either end that will engage and connect to the lamp 114, in the manner known in the art.

The adapter 250 is similar to the embodiment shown above. As such, the adapter 250 includes a male input 158, which may be prongs 162, added to each end of the lengthwise support 252. The male inputs 158 are designed to fit into the socket 28 (not shown in FIG. 3) that is pre-existing in the light fixture. These male inputs 158 will receive the power from the ballast 16 (not shown in FIG. 3). Again, the lengthwise support 252 and the adapter 250 is designed such that it will match the existing size of the T12 fixture, so a user simply can insert the prongs 162 into the corresponding feature on the socket 28 as a means of adding the adapter 250 to the fixture. In this manner, the adapter 250 may be retrofit to work with an existing T12 light fixture.

The adapter 250 also includes female outputs 154 (not shown in FIG. 3). These female outputs receive the prongs 32 (not shown in FIG. 3) from the lamps 114. In other words, the prongs 32 "plug in" to the female outputs 154 as a means of securing the lamp 114 to the adapter 250. Once secured, power may be transmitted and used to drive the lamps 114 via the female outputs 154. A user simply can insert the prongs 32 into the female outputs 154 as a means of adding the lamp 114 to the adapter 250.

The adapter 250 also includes circuitry 170 (not shown in FIG. 3). As noted above, the circuitry 170 is designed to adjust the power supplied by the T12 ballast to parameters usable by a T5 or T8 fluorescent lamp. In other words, the adapter 250 receives power from a T12 ballast (via the male inputs 158) and then converts it into parameters usable to drive a T5 or T8 lamp 114. Once converted, this power may be output to the lamp 114 via the female output 154. The circuitry 170 may be housed within the lengthwise support 252. Unlike the embodiment shown in FIG. 2, only one set of circuitry 170 is needed to convert the power. Again, those skilled in the art will appreciate how this conversion may be accomplished.

As described above, in the embodiment shown in FIG. 3, the adapter 250 is designed to receive a T8 lamp that is generally the same size as a T12 lamp. Those skilled in the art will appreciate that a similar embodiment may be constructed for a T5 lamp. For this reason, the lengthwise support 252 is longer than the lamp 114 and provides the location of the "offset" as needed. When installed onto the fixture, the lengthwise support 252 may be parallel (or substantially parallel) to the cover 15 (not shown in FIG. 3).

Figure 4A:
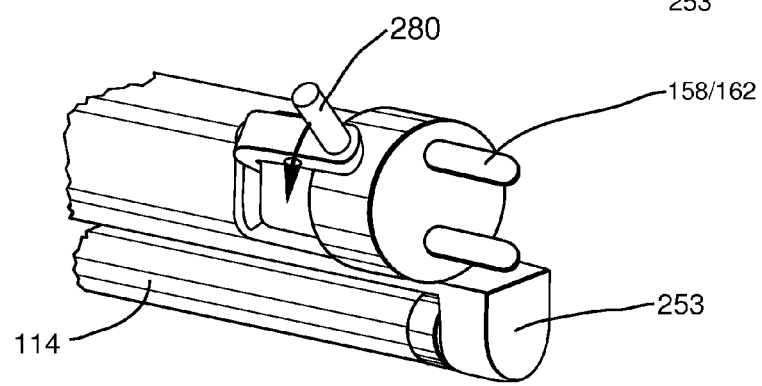
FIGS. 4A and 4B are perspective views of a portion of the embodiment of FIG. 3.
Figure 4B:
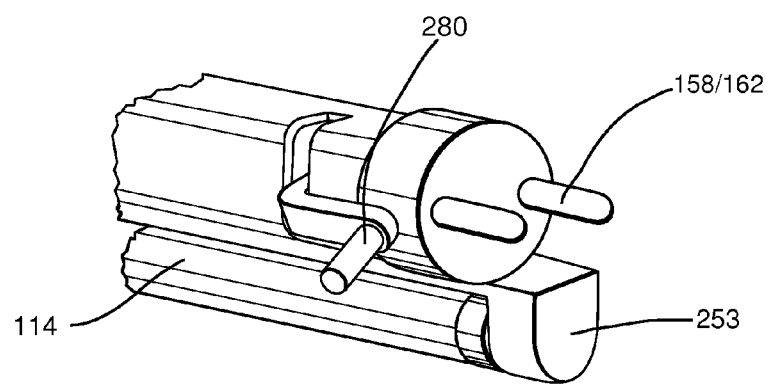

FIGS. 4A and 4B are enlarged view of a portion of the embodiment of FIG. 3. This view shows another possible feature for an adapter 250. The adapter 250 may include a locking feature 280 that is designed to facilitate engagement between the existing fluorescent light fixture and the adapter 250. As is known in the industry, some light fixtures are designed such that the lamp must be twisted, rotated, etc. when the prongs 32 (shown in FIG. 1) are inserted into the socket 28 (shown in FIG. 1). The locking feature 280 may be a latch or other similar feature used to address this issue. FIG. 4A shows the locking feature 280 unlocked whereas FIG. 4B shows the locking feature locked and engaged. As noted above, the male inputs 158 will be inserted/positioned into the socket 28. Once positioned, the locking member 280 may simply be twisted, rotated, engaged, etc. (in a direction that depends upon the ballast/light fixture), to finalize the engagement between the male inputs 158 and the socket 28 (as shown in FIG. 4B). There is no need for the adapter 250 to be twisted, rotated, etc. in order to effectuate proper engagement; rather, full engagement occurs by twisting, engaging the locking member 280. For example, in some embodiments, when a user actuates the locking member 280, the locking member 280 twists the male inputs 158 to make sure that these features fully engage and fit into the sockets 28. (In some embodiments, the locking member 280 may be offset by about 1 inch or set an angle. Other configurations are also possible.) Those skilled in the art will appreciate how such embodiments may be constructed. Obviously, the use of such locking members 280 may facilitate the insertion and retrofitting process. By latching/locking the lap 114 into position the force of the lamp 114 and/or the support 252 will hold the lamp 114 in place.

Those skilled in the art will appreciate that similar embodiments may be constructed that will convent T12 lamps (that are 5 feet long) to a five foot long T8 lamp and/or a 1449 cm T5 lamp. Adjustment from T12 lamps (that are 5 feet long) to smaller sized T8 lamps and/or smaller sized T5 lamps are also possible. Those skilled in the art will appreciate how this conversion may be made, including any offset that may need to be implement to fit the high frequency lamp into the fixture.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An adapter assembly for converting a low frequency fluorescent light fixture to a high-frequency fluorescent light fixture, the low frequency fluorescent light fixture having a low-frequency ballast and at least two tombstone sockets for connecting to and retaining a fluorescent lamp, the fluorescent lamp having a tube forming a light source upon being energized and double-prong terminals at opposite ends of the tube, the adapter assembly comprising:

an elongate adapter body having opposite ends spaced at a standard distance corresponding to a distance between the opposite ends of the fluorescent lamp;

two double-prong terminals respectively disposed at said opposite ends of said adapter body, said double-prong terminals being disposed at and corresponding to standard double-prong terminals of the low-frequency fluorescent lamp;

a circuit forming a high-frequency ballast configured to upconvert a low-frequency output signal of the low-frequency ballast to a high-frequency input signal for energizing a high-frequency fluorescent light fixture, said high-frequency ballast having an input side connected to said double-prong terminals at said opposite ends of said adapter body and an output side; and two sockets at said opposite ends of said elongate adapter body electrically connected to said output side of said high-frequency ballast and disposed to engage with and retain double-prong terminals of a high-frequency fluorescent lamp.

2. The adapter according to claim 1, wherein the low frequency fluorescent light fixture is a T12 fluorescent light fixture having a T12 ballast, and said high-frequency ballast is configured to energize a T8 fluorescent lamp.

3. The adapter according to claim 1, wherein the low frequency fluorescent light fixture is a T12 fluorescent light fixture having a T12 ballast, and said high frequency ballast is configured to energize a T5 fluorescent lamp.

4. The adapter according to claim 1, wherein the low frequency fluorescent light fixture is a T12 fluorescent light fixture and said elongated adapter body is formed to be connected in the T12 fluorescent light fixture in place of a T12 fluorescent lamp.

5. A method for retrofitting a T12 fluorescent light fixture having a T12 ballast with a high frequency fluorescent lamp, the method which comprises:

providing an adapter having an elongated body substantially similar in size to a T12 fluorescent lamp and containing a circuit forming a high-frequency ballast for upconverting a low-frequency power signal of a low-frequency ballast to a high-frequency power signal for energizing a T8 or a T5 fluorescent lamp;

removing a T12 fluorescent lamp from the T12 light fixture and installing the adapter in place of the T12 fluorescent lamp and connecting the adapter to the sockets previously occupied by the T12 fluorescent lamp; and connecting a T8 or a T5 fluorescent lamp into the adapter.

6. The method according to claim 5, wherein the connecting step is combined with the providing step, and the removing step is carried out prior to or subsequently to the providing and connecting steps.

* * * * *